United States Patent
Jeong et al.

(10) Patent No.: US 10,303,366 B2
(45) Date of Patent: May 28, 2019

(54) DATA STORAGE DEVICE THAT DIVIDES AND PROCESSES A COMMAND AND DATA PROCESSING SYSTEM INCLUDING THE SAME

(71) Applicant: SAMSUNG ELECTRONICS CO., LTD., Suwon-si, Gyeonggi-do (KR)

(72) Inventors: Gi Jo Jeong, Gwacheon-si (KR); Tae Hack Lee, Hwaseong-si (KR); Sang Kyoo Jeong, Seoul (KR); Kwang Ho Choi, Seoul (KR); Myeong Eun Hwang, Seongnam-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 301 days.

(21) Appl. No.: 15/094,454

(22) Filed: Apr. 8, 2016

(65) Prior Publication Data
US 2016/0299690 A1    Oct. 13, 2016

(30) Foreign Application Priority Data

Apr. 9, 2015    (KR) .......................... 10-2015-0050392

(51) Int. Cl.
*G06F 3/06* (2006.01)

(52) U.S. Cl.
CPC ............ *G06F 3/061* (2013.01); *G06F 3/0659* (2013.01); *G06F 3/0688* (2013.01)

(58) Field of Classification Search
CPC ...... G06F 3/0659; G06F 3/061; G06F 3/0688; G06F 12/0246; G06F 9/30018; G06F 2212/2022; G06F 3/0679

USPC .................. 711/103, 202, E12.002, E12.008
See application file for complete search history.

(56) References Cited

U.S. PATENT DOCUMENTS

| | | | |
|---|---|---|---|
| 7,752,349 B2 | 7/2010 | Ishida et al. | |
| 8,041,850 B2 | 10/2011 | Kasahara et al. | |
| 8,131,302 B2 | 3/2012 | Quigley et al. | |
| 8,335,514 B2 | 12/2012 | Quigley et al. | |
| 8,719,455 B2 | 5/2014 | Mejdrich et al. | |
| 8,769,232 B2 | 7/2014 | Suryabudi et al. | |
| 9,390,017 B2 * | 7/2016 | Hagspiel | G06F 12/0848 |
| 2006/0236001 A1 | 10/2006 | Tanabe | |
| 2007/0011489 A1 | 1/2007 | Li et al. | |
| 2010/0106873 A1 * | 4/2010 | Funakura | G06K 7/0008 |
| | | | 710/106 |
| 2011/0276768 A1 * | 11/2011 | Koren | G06F 12/08 |
| | | | 711/154 |
| 2012/0042105 A1 | 2/2012 | Maeda et al. | |

(Continued)

FOREIGN PATENT DOCUMENTS

| | | |
|---|---|---|
| JP | 2002-366507 | 12/2002 |
| JP | 2009-289085 | 12/2009 |
| KR | 1020130122187 | 11/2013 |

*Primary Examiner* — Tuan V Thai
*Assistant Examiner* — Edward Waddy, Jr.
(74) *Attorney, Agent, or Firm* — F. Chau & Associates, LLC

(57) ABSTRACT

A data storage device includes a processor and a non-volatile memory. The processor compares a data processing size of a first command received from the host at a first time point with a reference size and divides the first command into a plurality of sub-commands when the data processing size is greater than the reference size. The data storage device further includes a memory that includes a first queue and a second queue.

16 Claims, 12 Drawing Sheets

(56) References Cited

U.S. PATENT DOCUMENTS

| | | |
|---|---|---|
| 2013/0179614 A1 | 7/2013 | Ross et al. |
| 2014/0351456 A1* | 11/2014 | Sharifie ................. G06F 3/0613 710/5 |
| 2015/0058529 A1* | 2/2015 | Lin ....................... G06F 3/0604 711/103 |
| 2015/0095555 A1* | 4/2015 | Asnaashari ........... G06F 3/0665 711/103 |

* cited by examiner

DATA STORAGE DEVICE THAT DIVIDES AND PROCESSES A COMMAND AND DATA PROCESSING SYSTEM INCLUDING THE SAME

CROSS-REFERENCE TO RELATED APPLICATION

This application claims priority under 35 U.S.C. § 119(a), and the benefit of, Korean Patent Application No. 10-2015-0050392 filed on Apr. 9, 2015 in the Korean Intellectual Property Office, the contents of which are herein incorporated by reference in their entirety.

BACKGROUND

Embodiments of the inventive concept are directed to a data storage device, and more particularly, to a data storage device that divides and processes a command received from a host, depending on a data processing size of the command, and a data processing system including the same.

A data storage device may receive or fetch a command from a host to perform a data transmission operation, such as a write operation or a read operation. The data storage device may receive a plurality of commands from a host at a certain time point and may process the commands in order. The commands may have different data processing sizes. A processing time or latency)for a command having a large data processing size may be longer than that for a command having a small data processing size.

When a first command having a large data processing size is processed first and then a second command having a small data processing size is processed, processing of the second command may be unnecessarily delayed due to the first command processing time, which can deteriorate service quality (QoS) of the data storage device. As a result, the overall performance of the data storage device may be degraded.

SUMMARY

According to some embodiments of the inventive concept, there is provided a data storage device connected with a host. The data storage device includes a processor and a non-volatile memory. The processor compares a data processing size of a first command received from the host at a first time point with a reference size and divides the first command into a plurality of sub-commands when the data processing size is greater than the reference size. The data storage device may further include a memory that includes a first queue and a second queue. A first sub-command of the plurality of sub-commands to be processed may be stored in the first queue and remaining plurality of sub-commands may be stored in the second queue.

The processor may receive a second command from the host at the first time point and process either the first sub-command or the second command based on the order in which the first command and the second command have been received. The processor may process the remaining plurality of sub-commands after processing the first sub-command and the second command. The processor may receive a plurality of third commands from the host at the first time point after receiving the first and second commands; and may process a predetermined number of third commands between processing individual sub-commands of the remaining plurality of sub-commands. When a second command is received while one but not the last of the plurality of sub-commands is being processed, the processor may process the second command before the last of the plurality of sub commands is processed.

The data storage device may further include a controller that controls data processing operations of the non-volatile memory based on the first command. The controller may support a protocol for processing commands out of order. The controller may include a context saving block that stores information about a subsequent sub-command after one of the plurality of sub-commands is processed.

A data processing size of each of the plurality of sub-commands may be less than or equal to the reference size, and the reference size and the data processing size of each of the plurality of sub-commands may be changeable using firmware. The data storage device may be either a solid state drive (SSD) or a universal flash storage (UFS).

According to other embodiments of the inventive concept, there is provided a data processing system including a data storage device that includes a processor and a non-volatile memory, and a host that controls an operation of the data storage device. The data storage device may receive a plurality of commands at a first time point and compare a data processing size of each command received from the host at the first time point with a reference size. When the data processing size of a first command is greater than the reference size, the data storage device may divide the first command into a plurality of sub-commands having a data processing size less than or equal to the reference size. The data storage device may process either a first sub-command or a second command received after the first command based on the order in which the first and second commands are received, and may process the remaining sub-commands after processing the first sub-command and the second command. The data storage device may process a predetermined number of third commands received after the second command between processing individual sub-commands of the remaining sub-commands.

According to other embodiments of the inventive concept, there is provided a method of operating a data storage device. The method includes receiving a first command from a host at a first time point; comparing a data processing size of the first command with a reference size; and dividing the first command into a plurality of consecutive sub-commands, if the data processing size is greater than the reference size.

The method may further include, upon receiving a second command from the host at the first time point, determining the processing order of the first and second commands; processing a first sub-command and the second command in the determined order; and processing the remaining plurality of sub-commands in order.

The method may further include, upon receiving a third command at a second time point while a current sub-command is being processed, processing the third command after processing the current sub-command and before processing a subsequent sub-command.

DETAILED DESCRIPTION OF EXEMPLARY EMBODIMENTS

Figure 1:
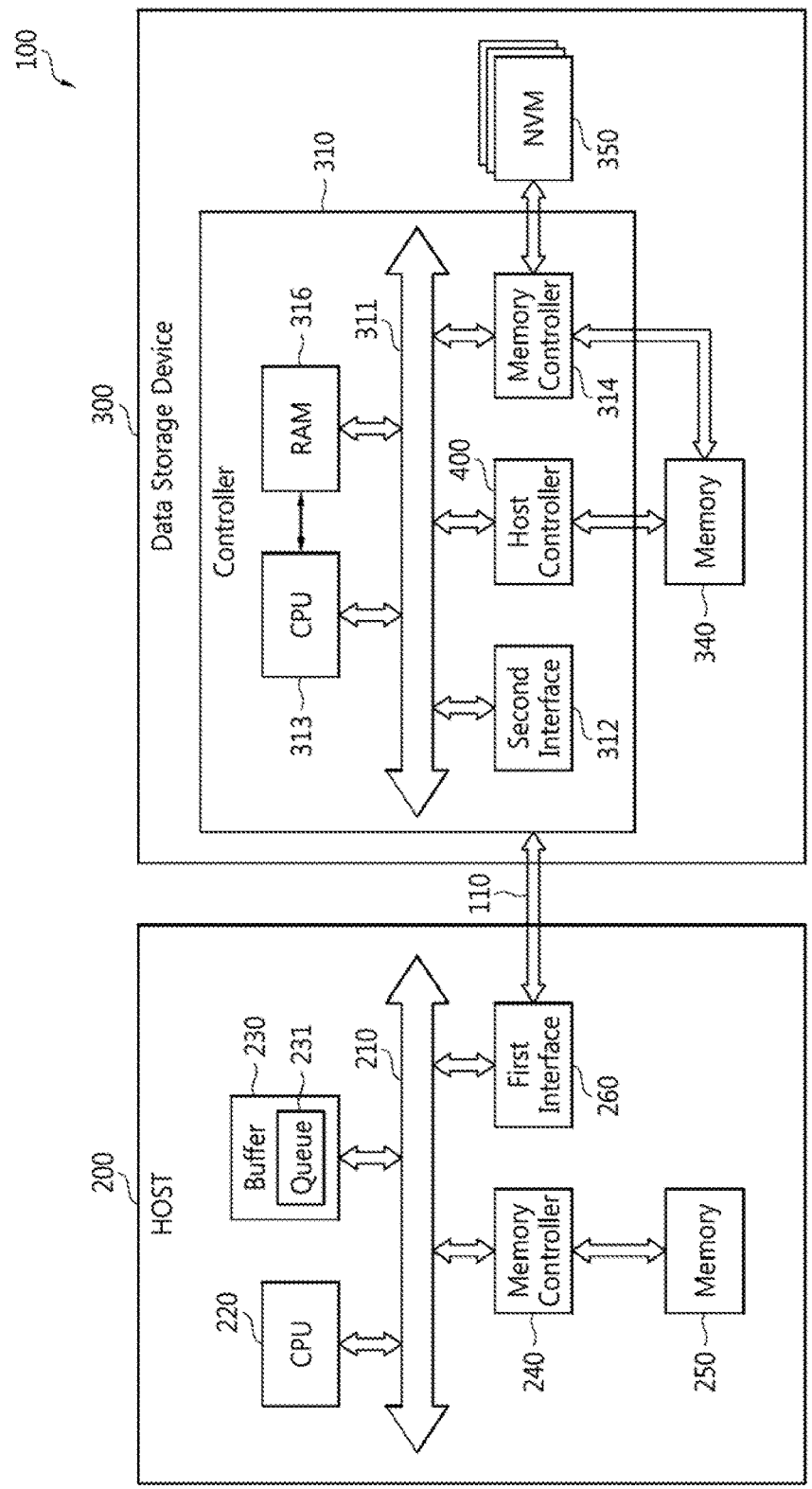
FIG. 1 is a schematic block diagram of a data processing system according to some embodiments of the inventive concept.

Exemplary embodiments of the inventive concept now will be described more fully hereinafter with reference to the accompanying drawings, in which embodiments of the invention are shown. Embodiments of the disclosure may, however, be embodied in many different forms and should not be construed as limited to the embodiments set forth herein. In the drawings, the size and relative sizes of layers and regions may be exaggerated for clarity. Like numbers may refer to like elements throughout.

It will be understood that when an element is referred to as being "connected" or "coupled" to another element, it can be directly connected or coupled to the other element or intervening elements may be present.

FIG. 1 is a schematic block diagram of a data processing system 100 according to some embodiments of the inventive concept. The data processing system 100 includes a host 200 and a data storage device 300 which are connected with each other through an interface 110. The data processing system 100 may be implemented as a server computer, a personal computer (PC), a desktop computer, a laptop computer, a workstation computer, network-attached storage (NAS), a data center, an internet data center (IDC), or a mobile computing device. The mobile computing device may be a smart phone, a tablet PC, or a mobile internet device (MID).

According to some embodiments, the host 200 controls a data processing operation, such as a write or read operation, of the data storage device 300. The host 200 includes a central processing unit (CPU) 220, a buffer 230, a memory controller 240, a memory 250, a first interface 260, and a bus architecture 210. However, it is to be understood that the host 200 illustrated in FIG. 1 is a non-limiting example provided for convenience' sake in the description and embodiments of the inventive concept are not limited thereto.

The host 200 may be implemented as an integrated circuit (IC), a motherboard, or a system on chip (SoC). The host 200 may also be implemented as an application processor (AP) or a mobile AP.

The CPU 220 communicates commands and/or data with the buffer 230, the memory controller 240, and the first interface 260 through the bus architecture 210. The bus architecture 210 may be implemented as an advanced microcontroller bus architecture (AMBA), an advanced extensible interface (AXI), or an advanced high-performance bus (AHB), but embodiments of the inventive concept are not limited thereto.

The CPU 220 can generate a command, such as a write command or a read command, which will be described below. The CPU 220 is a processor that can execute a program or programs that perform operations according to some embodiments of the inventive concept.

According to some embodiments, the buffer 230 includes a queue 231. The buffer 230 may be implemented as a register or as static random access memory (SRAM). The queue 231 may be a submission queue. The queue 231 can store commands, such as write or read commands. The queue 231 may also include a completion queue, but embodiments of the inventive concept are not limited thereto.

The memory controller 240 can write data to or read data from the memory 250 under control of the CPU 220. According to some embodiments, the memory controller 240 includes a direct memory access (DMA) controller.

The memory 250 may include volatile memory and/or non-volatile memory. The volatile memory may be random access memory (RAM), static RAM (SRAM), or dynamic RAM (DRAM). The non-volatile memory may be implemented as a hard disk drive (HDD), a NAND flash memory, a NOR flash memory, a phase-change RAM (PRAM), a magnetoresistive RAM (MRAM), a spin-transfer torque MRAM (STT-MRAM), a ferroelectric RAM (FRAM), or a resistive RAM (RRAM).

Although one memory controller 240 and one memory 250 are illustrated in FIG. 1, the memory controller 240 may refer to a plurality of memory controllers and the memory 250 may also refer to a plurality of memories. Each of the memories may be a different type of memory. Although the buffer 230 includes the queue 231 in the embodiments illustrated in FIG. 1, the queue 231 may be part of the memory 250 in other embodiments.

According to some embodiments, the first interface 260 is connected with a second interface 312 in the data storage device 300 via the interface 110. The interfaces 110, 260, and 312 may be able to support a peripheral component interconnect express (PCIe) protocol, but embodiments of the inventive concept are not limited thereto.

The interface 110 may be a serial advanced technology attachment (SATA) interface and each of the interfaces 260 and 312 may be a PCIe interface, but embodiments of the inventive concept are not limited thereto. According to some embodiments, the interfaces 260 and 312 perform protocol conversion between the SATA interface and the PCIe interface.

According to some embodiments, the data storage device 300 includes a controller 310, a memory 340, and a non-volatile memory 350. The data storage device 300 is a flash-based memory device. The data storage device 300 may be implemented as a solid-state drive or solid-state disk (SSD), an embedded SSD (eSSD), or a universal flash storage (UFS). The data storage device 300 may be attached to or detached from the host 200. The data storage device 300 can be implemented in the form of a memory module.

According to some embodiments, the non-volatile memory 350 may have a two-dimensional (2D) or three-dimensional (3D) memory cell array and a control logic circuit that controls a program operation, a read operation, or an erase operation of the memory cell array. A 3D memory array can be monolithically formed in one or more physical layers of arrays of memory cells, each having an active area disposed above a silicon substrate and circuitry associated with the operation of those memory cells. The associated circuitry may be above or within the silicon substrate. The term "monolithic" means that each layer of the array is directly deposited on the underlying layer of the array. In an embodiment of the present inventive concept, the 3D memory array includes vertically oriented NAND strings such that at least one memory cell is located over another memory cell. The at least one memory cell may comprise a charge trap layer.

According to some embodiments, the data storage device 300 can receive commands, such as a write command or a read command, issued at a first time point and may divide a first command of the received commands having a data processing size greater than a reference size into a plurality of consecutive sub-commands. Unlike a conventional data storage device that processes commands in order, the data storage device 300 can process other commands between sub-commands. Accordingly, the commands may be processed out of order.

According to some embodiments, the controller 310 controls transmission of commands and/or data communicated among the host 200, the memory 340, and the non-volatile memory 350. The controller 310 includes a second interface 312, a CPU 313, a memory controller 314, a RAM 316, a host controller 400, and bus architecture 311. The second interface 312 is connected with the first interface 260 of the host 200 via the interface 110.

The CPU 313 can control operations of the second interface 312, the memory controller 314, the RAM 316, and the host controller 400 via the bus architecture 311. Although one CPU 313 is illustrated in FIG. 1, the CPU 313 may be a CPU set that includes a first CPU for controlling interactive operations with the host 200 and a second CPU for controlling interactive operations with the non-volatile memory 350. The first CPU can control the operations of the second interface 312 and the second CPU can control the operations of the memory controller 314 and/or the host controller 400.

According to some embodiments, the second interface 312, the CPU 313, the memory controller 314, the RAM 316, and the host controller 400 communicate commands and/or data with one another via the bus architecture 311. The bus architecture 311 may be AMBA, AXI, or AHB, as described above, but embodiments are not limited thereto.

According to some embodiments, the memory controller 314 writes data to or reads data from the memory 340 under control of the CPU 313. The memory controller 314 can also write data to or read data from the non-volatile memory 350 under control of the CPU 313 and/or the host controller 400. When the non-volatile memory 350 is implemented as flash memory, the memory controller 314 can function as a flash memory controller.

According to some embodiments, the host controller 400 writes data to or reads data from the memory 340 under control of the CPU 313. The host controller 400, together with the non-volatile memory 350, can perform through DMA data processing operations, such as a write operation or a read operation, that correspond to each of the commands, such as write commands or read commands, stored in the RAM 316. The data processing operations are processed by DMA units.

According to some embodiments, the host controller 400 can support an out-of-order command processing protocol. The host controller 400 may be a non-volatile memory express (NVMe) or a non-volatile memory host controller interface specification (NVMHCI) controller, or a small computer system interface express (SCSIe) controller, but embodiments are not limited thereto.

According to some embodiments, the RAM 316 functions as a buffer that includes a plurality of queues. The RAM 316 may be implemented as tightly coupled memory (TCM). The queues included in the RAM 316 will be described with reference to FIG. 2, below.

According to some embodiments, the memory 340 is implemented as a volatile memory such as a DRAM. Although the RAM 316 and the memory 340 are separated from each other in the embodiments illustrated in FIG. 1, the RAM 316 and the memory 340 may refer to the same memory or the RAM 316 may be part of the memory 340. The non-volatile memory 350 may be implemented as flash memory, such as a NAND flash memory or a NOR flash memory, but embodiments are not limited thereto.

Figure 2:
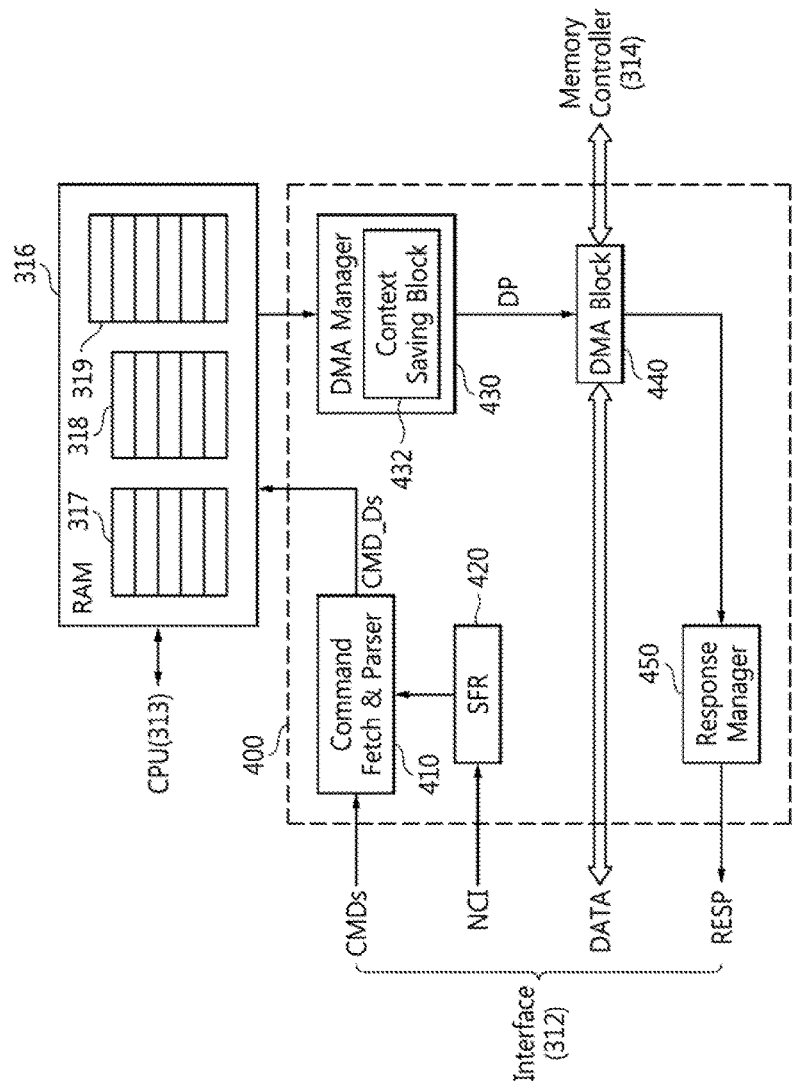
FIG. 2 is a schematic block diagram of a host controller illustrated in FIG. 1.

FIG. 2 is a schematic block diagram of the host controller 400 illustrated in FIG. 1. Referring to FIGS. 1 and 2, the host controller 400 includes a command fetch and parser 410, a special function register (SFR) 420, a DMA manager 430, a DMA block or DMA execution block 440, and a response manager 450.

According to some embodiments, the SFR 420 receives, from the host 200, indication data or information NCI indicating the number of commands stored at the queue 231 in the buffer 230 of the host 200 and outputs the indication data NCI to the command fetch and parser 410. The command fetch and parser 410 receives or fetches as many commands CMDs from the queue 231 as the number corresponding to the indication data NCI in an index order of the queue 231 and transmits the fetched commands CMD_Ds to the CPU 313 or the RAM 316 in the index order. The command fetch and parser 410 transmits each of the fetched commands CMD_Ds in the form of a descriptor to allow the CPU 313, or firmware run in the CPU, to analyze the fetched commands CMD_Ds. According to some embodiments, the RAM 316 includes a first queue 317, a second queue 318, and a third queue 319.

When receiving the fetched commands CMD_Ds from the command fetch and parser 410, the CPU 313 analyzes each of the fetched commands CMD_Ds. The CPU 313 compares the data processing size of each of the fetched commands CMD_Ds with a reference size and divides at least one fetched command having a data processing size greater than the reference size into a plurality of consecutive sub-commands. The CPU 313 may also divide each of the fetched commands CMD_Ds into a plurality of DMA descriptors having a standard DMA processing size.

According to some embodiments, the first queue 317 stores those commands that have not been divided and a first sub-command of the plurality of sub-commands according to the order in which the commands have been received from the command fetch and parser 410. The second queue 318 stores the remaining sub-commands and the third queue 319 stores the DMA descriptors. Each of the fetched commands CMD_Ds or the plurality of sub-commands may correspond to a different DMA descriptor.

According to some embodiments, the CPU 313 determines the processing order of commands stored in the first queue 317 and the second queue 318. For example, the CPU 313 may process the commands stored in the first queue 317 in order and then process the commands stored in the second queue 318, but embodiments of the inventive concept are not limited thereto. The operations of the CPU 313 will be described in detail with reference to FIGS. 3 through 10.

According to some embodiments, the DMA manager 430 controls DMA operations with the non-volatile memory 350 according to the processing order determined by the CPU 313. The DMA manager 430 includes a context saving or storage block 432. When a DMA operation is performed on a sub-command other than the last sub-command, the context saving block 432 can store information about a subsequent sub-command. The information may include the location of a first DMA descriptor for the subsequent sub-command.

According to some embodiments, the DMA block 440 communicates data with the memory controller 314 or the non-volatile memory 350 in response to a control signal DP received from the DMA manager 430. The DMA block 440 may include memory that stores write data received from the second interface 312 or read data received from the non-volatile memory 350.

According to some embodiments, the response manager 450 transmits a response signal RESP indicating that a DMA operation has been performed from the DMA manager 430 to the host 200.

In the embodiments of the inventive concept, processing a command means that the host 200 has recognized from the response signal RESP that one command has been processed, indicating the completion of the DMA operation.

Figure 3:
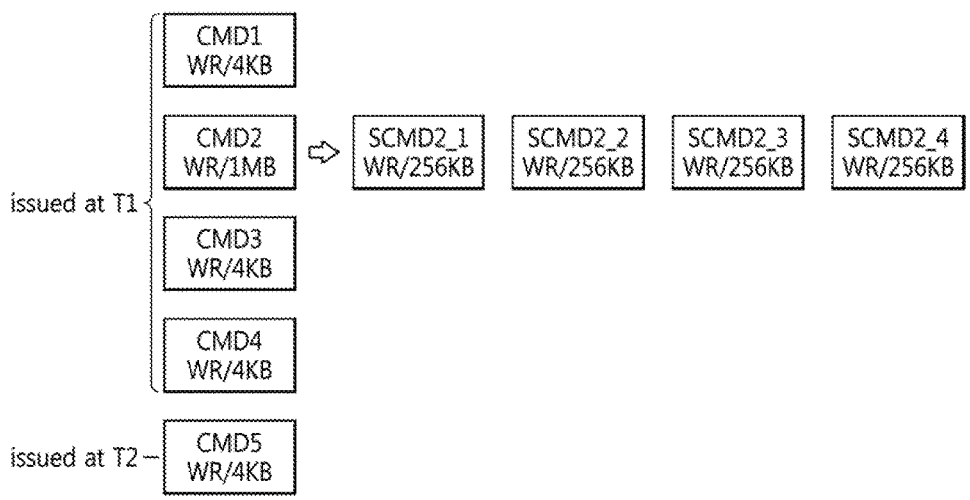
FIGS. 3 through 5 illustrate a procedure in which a data storage device processes commands received from a host according to some embodiments of the inventive concept.
Figure 4:
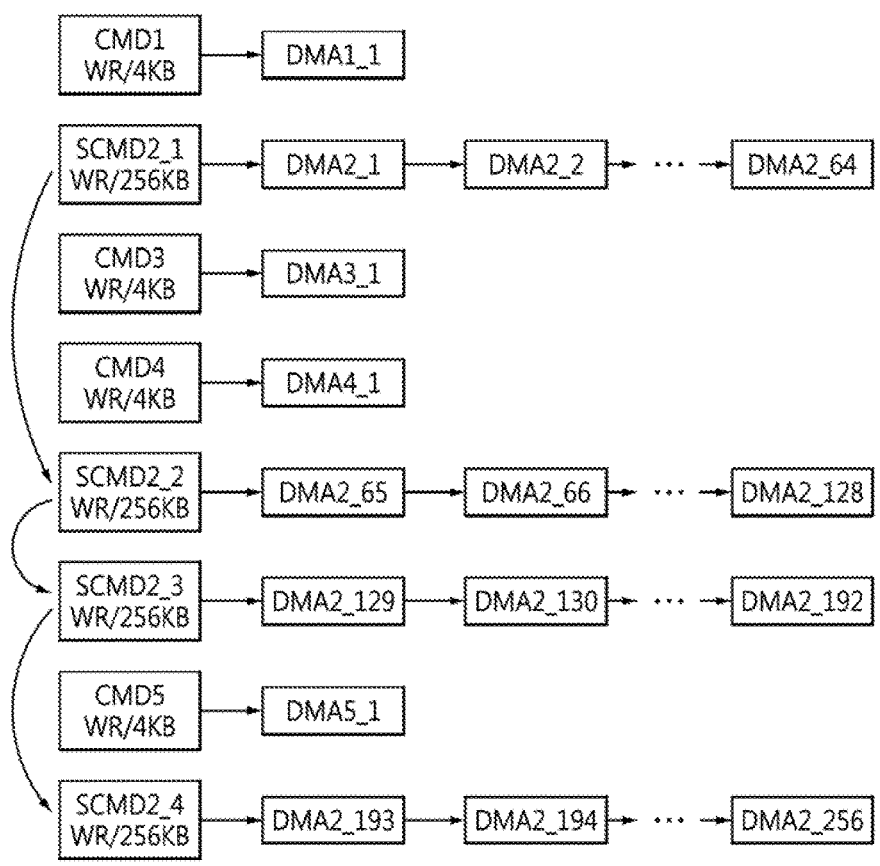
Figure 5:
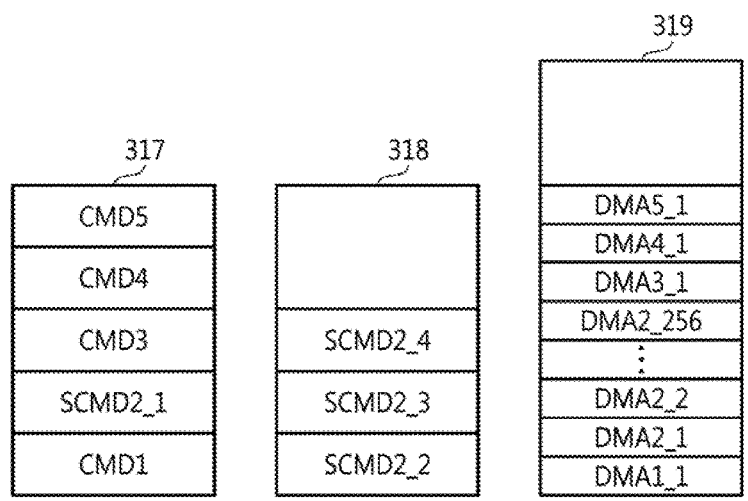

FIGS. 3 through 5 illustrate a procedure according to some embodiments of the inventive concept in which the data storage device 300 processes commands received from the host 200. It is assumed that first through fourth commands CMD1 through CMD4 are issued at a first time point T1 and a fifth command CMD5 is issued at a second time point T2.

Referring to FIGS. 1 through 3, the command fetch and parser 410 receives the first through fourth commands CMD1 through CMD4 issued from the host 200 in a packet form at the first time point T1. Here, "receives" refers to an operation in which the command fetch and parser 410 fetches the first through fourth commands CMD1 through CMD4 from the host 200. When the first through fourth commands CMD1 through CMD4 are stored in the queue 231 of the buffer 230 in order, the command fetch and parser 410 can sequentially receive the first through fourth commands CMD1 through CMD4 in the order, i.e., the index order of the queue 231, in which the commands CMD1 through CMD4 are stored in the queue 231.

The command fetch and parser 410 may transmit the first through fourth commands CMD1 through CMD4 to the CPU 313 or the RAM 316. According to some embodiments, the command fetch and parser 410 transmits the first through fourth commands CMD1 through CMD4 in a descriptor form. A descriptor form includes information about each of the first through fourth commands CMD1 through CMD4, for example, a command type and a data processing size. Referring to FIG. 3, the first through fourth commands CMD1 through CMD4 are all write (WR) commands with respective data processing sizes of 4 KB, 1 MB, 4 KB, and 4 KB.

According to some embodiments, the CPU 313, or firmware run in the CPU, analyzes the first through fourth commands CMD1 through CMD4. The CPU 313 compares a data processing size of each of the first through fourth commands CMD1 through CMD4 with a reference size and divides those commands that have a data processing size greater than the reference size into a plurality of consecutive sub-commands. According to embodiments of the inventive concept, the reference size is 256 kilobytes (KB), but the reference size can be changed by a user or a manager using the firmware to set up the data storage device 300.

Referring to FIG. 3, the data processing size of the second command CMD2, 1MB, is greater than the reference size, and therefore, the CPU 313 divides the second command CMD2 into a plurality of sub-commands SCMD2_1 through SCMD2_4, each having a data processing size of 256 KB. Although the second command CMD2 is divided into the four sub-commands SCMD2_1 through SCMD2_4 and each of the sub-commands SCMD2_1 through SCMD2_4 has a data processing size equal to the reference size in the embodiments illustrated in FIG. 3, embodiments of the inventive concept are not limited thereto. The number of sub-commands and the data processing size of the sub-commands may be changed using firmware. For clarity of description, the sub-commands corresponding to the second command CMD2 will be referred to as second-sub-commands.

Referring to FIGS. 3 and 5, the CPU 313 may store each of the first, third and fourth commands CMD1, CMD3, and CMD4 and the second-sub-commands SCMD2_1 through SCMD2_4 in either the first queue 317 or the second queue 318. For example, undivided commands CMD1, CMD3, and CMD4 and the first second-sub-command SCMD2_1 may be stored in the first queue 317 and the remaining second-sub-commands SCMD2_2 through SCMD2_4 may be stored in the second queue 318. According to some embodiments, commands are stored in the first queue 317 in the index order of the queue 231 of the host 200.

Referring to FIGS. 4 and 5, the CPU 313 converts each of the first through fourth commands CMD1 through CMD4 into at least one DMA descriptor. If a DMA unit is 4 KB, each of the commands CMD1, CMD3, and CMD4 is converted into a single DMA descriptor DMA1_1, DMA3_1, or DMA4_1, respectively. Each of the second-sub-commands SCMD2_1 through SCMD2_4 is converted into 64 DMA descriptors DMA2_1 through DMA2_64, DMA2_65 through DMA2_128, DMA2_129 through DMA2_192, or DMA2_193 through DMA2_256.

According to some embodiments, the DMA descriptors DMA1_1, DMA2_1 through DMA2_256, DMA3_1, and DMA4_1 are stored in order in a third queue 319. The contents of a DMA descriptor are known to those of ordinary skill in the art, and therefore, a description of a DMA descriptor will be omitted.

When a fifth command CMD5 is issued at the second time point T2 after the first time point T1, the command fetch and parser 410 receives the fifth command CMD5 from the host 200 and transmits it to the CPU 313 or the RAM 316. The fifth command CMD5 is a write command with a data processing size of 4 KB, and therefore, the CPU 313 stores the fifth command CMD5 in the first queue 317 without dividing it and stores a DMA descriptor DMA5_1 for the fifth command CMD5 in the third queue 319.

Figure 6:
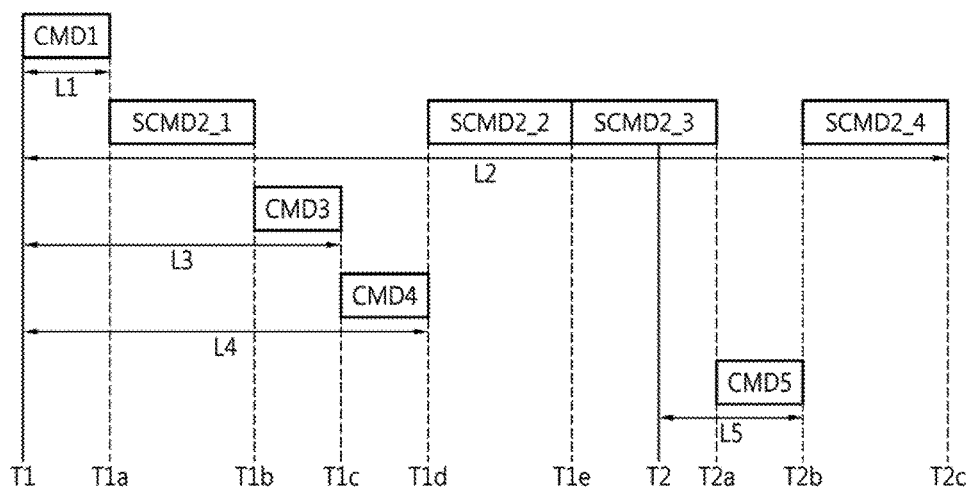
FIG. 6 is a timing chart of command processing of a data storage device according to embodiments illustrated in FIGS. 3 through 5.

FIG. 6 is a timing chart of the command processing of the data storage device 300 according to embodiments illustrated in FIGS. 3 through 5. Referring to FIGS. 1 through 6, the CPU 313, or firmware run in the CPU, determines the order of processing the commands CMD1, SCMD2_1 through SCMD2_4, CMD3, and CMD4 stored in the first queue 317 and the second queue 318. The data storage device 300 first processes the commands CMD1, SCMD2_1, CMD3, and CMD4 stored in the first queue 317 in order and then processes the second-sub-commands SCMD2_2 through SCMD2_4 stored in the second queue 318 in order.

Referring to FIG. 6, of the first through fourth commands CMD1 through CMD4 issued at the first time point T1, the first command CMD1 finishes processing at time T1$a$ for a latency L1, the first second-sub-command SCMD2_1 of the second command CMD2 finishes processing at time T1$b$, and third and fourth commands CMD3 and CMD4 can be sequentially processed, finishing at times T1$c$ and T1$d$, with latencies of L2 and L4, respectively. The DMA manager 430 can store, in the context saving block 432, location information of the first DMA descriptor DMA2_65 of the second second-sub-command SCMD2_2 stored in the third queue 319, i.e., an index of the third queue 319-1 after the first second-sub-command SCMD2_1 is processed.

There is no command in the first queue 317 after the fourth command CMD4 is processed, and therefore, the second second-sub-command SCMD2_2 and the third second-sub-command SCMD2_3 stored in the second queue 318-1 are processed in order, finishing at times T1e and T2a. At this time, the DMA manager 430 can process, or perform DMA on, the second second-sub-command SCMD2_2 using the index of the first DMA descriptor DMA2_65 of the second second-sub-command SCMD2_2, which is stored in the context saving block 432.

If the fifth command CMD5 is issued and stored in the first queue 317 at the second time point T2 while the third second-sub-command SCMD2_3 is being processed, the data storage device 300 stores, in the context saving block 432, an index of the first DMA descriptor DMA2_193 of the fourth second-sub-command SCMD2_4, which is stored in the third queue 319, after processing the third second-sub-command SCMD2_3 and processes the fifth command CMD5 before processing the fourth second-sub-command SCMD2_4, finishing at time T2b with a latency L5.

There is no command in the first queue 317 after the fifth command CMD5 is processed, and therefore, the data storage device 300 can process the fourth second-sub-command SCMD2_4 stored in the second queue 318, finishing at time T2c with a latency L2 using the index of the DMA descriptor DMA2_193, which is stored in the context saving block 432. As the fourth second-sub-command SCMD2_4 is processed, processing of the second command CMD2 is completed.

In other words, the third and fourth commands CMD3 and CMD4 are processed before the second command CMD2 is processed, and therefore, the processing time or latency L3 of the third command CMD3 and the latency L4 of the fourth command CMD4 may be reduced as compared to conventional approaches.

In the embodiments illustrated in FIGS. 3 through 6, commands stored in the first queue 317 are processed in order and then commands stored in the second queue 318 are processed. However, embodiments are not limited thereto, and the data storage device 300 may process the commands in different orders in other embodiments.

In the embodiments illustrated in FIG. 6, commands, such as the third and fourth commands CMD3 and CMD4, currently stored in the first queue 317 are all processed between sub-commands, such as the first second-sub-command SCMD2_1 and the second second-sub-command SCMD2_2. However, only the third command CMD3 can be processed between the first second-sub-command SCMD2_1 and the second second-sub-command SCMD2_2 and the fourth command CMD4 can be processed after the second second-sub-command SCMD2_2 is processed. In other words, the number of commands processed between divided sub-commands may be set by firmware in different embodiments.

Figure 7:
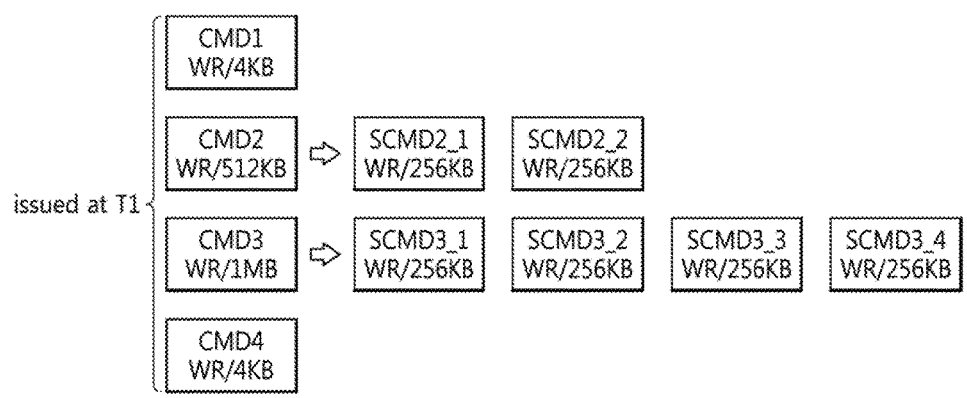
FIGS. 7 through 9 illustrate a procedure in which a data storage device processes commands received from a host according to other embodiments of the inventive concept.
Figure 8:
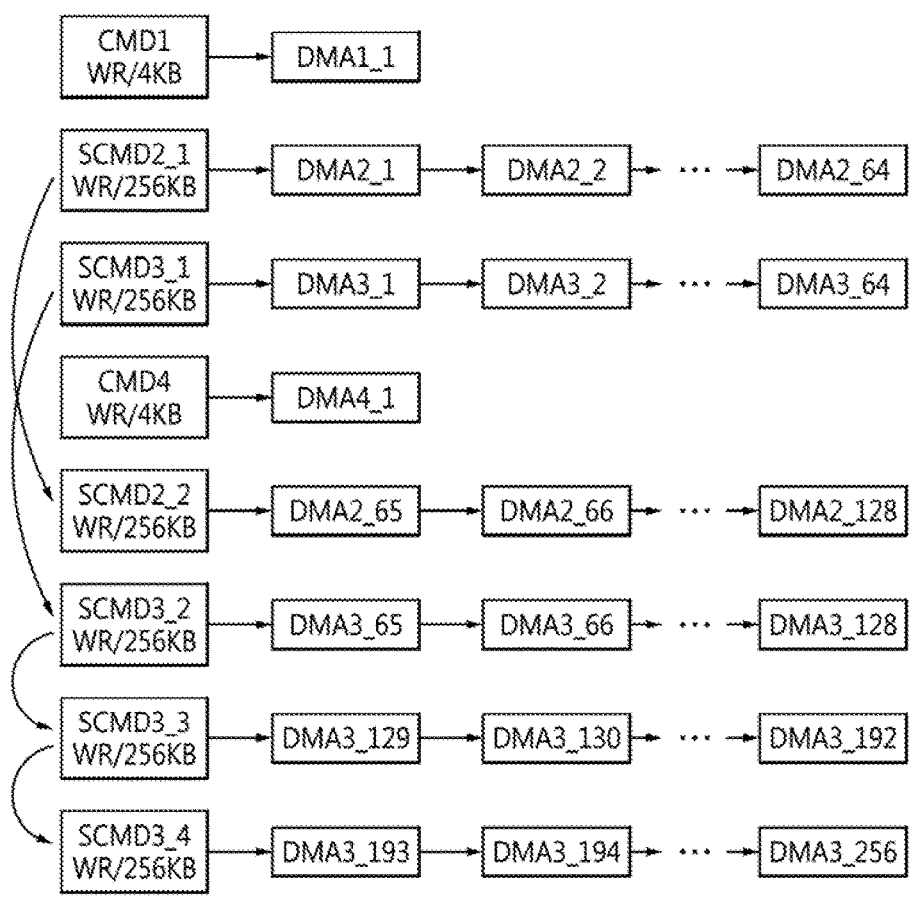
Figure 9:
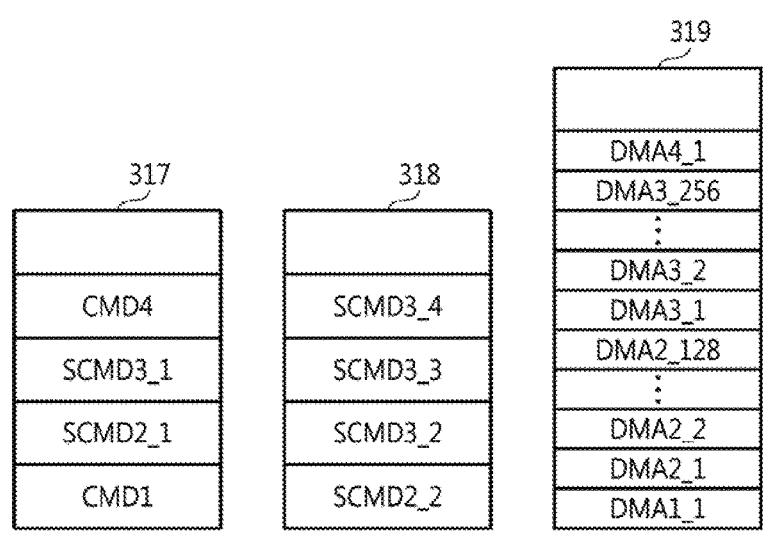

FIGS. 7 through 9 illustrate a procedure according to other embodiments of the inventive concept in which the data storage device 300 processes commands received from the host 200. It is assumed that the first through fourth commands CMD1 through CMD4 are issued at the first time point T1.

Referring to FIGS. 1 through 7, the command fetch and parser 410 receives the first through fourth commands CMD1 through CMD4 from the host 200 at the first time point T1. The first through fourth commands CMD1 through CMD4 are stored in the queue 231 of the buffer 230 of the host 200 in order, and the command fetch and parser 410 can sequentially receive the first through fourth commands CMD1 through CMD4 in order, i.e., in the index order of the queue 231, in which the commands CMD1 through CMD4 are stored in the queue 231.

The command fetch and parser 410 may transmit the first through fourth commands CMD1 through CMD4 to the CPU 313 or the RAM 316. According to some embodiments, the command fetch and parser 410 transmits the first through fourth commands CMD1 through CMD4 in a descriptor form.

According to some embodiments, the CPU 313, or firmware run in the CPU, analyzes the first through fourth commands CMD1 through CMD4. The CPU 313 compares a data processing size of each of the first through fourth commands CMD1 through CMD4 with a reference size and divides those commands that have a data processing size greater than the reference size into a plurality of consecutive sub-commands. The reference size can be changed by a user or a manager.

Referring to FIG. 7, the data processing sizes of the second and third command CMD2 and CMD3 are greater than the reference size, and therefore, the CPU 313 divides the second command CMD2 into a plurality of second-sub-commands SCMD2_1 and SCMD2_2 and divides the third command CMD3 into a plurality of third-sub-commands SCMD3_1 through SCMD3_4, wherein the term "third-sub-commands" refers to sub-commands that correspond to the third command CMD3. As described above with reference to FIG. 3, the number of sub-commands and the data processing size of the sub-commands can vary with embodiments.

Referring to FIGS. 7 and 9, the CPU 313 may store each of the first command CMD1, the second-sub-commands SCMD2_1 and SCMD2_2, the third-sub-commands SCMD3_1 through SCMD3_4, and the fourth command CMD4 in either the first queue 317 or the second queue 318. For example, the undivided commands CMD1 and CMD4, the first second-sub-command SCMD2_1 of the second-sub-commands SCMD2_1 and SCMD2_2, and the first third-sub-command SCMD3_1 of the third sub-commands SCMD3_1 through SCMD3_4 are stored in the first queue 317 and the remaining second-sub-command SCMD2_2 and the remaining third-sub-commands SCMD3_2 through SCMD3_4 are stored in the second queue 318. Commands can be stored in the first queue 317 and the second queue 318 in the index order of the queue 231 of the host 200.

Referring to FIGS. 8 and 9, the CPU 313 converts each of the first through fourth commands CMD1 through CMD4 into at least one DMA descriptor. If a DMA unit is 4 KB as described with reference to FIGS. 4 and 5, each of the commands CMD1 and CMD4 is converted into a DMA descriptor DMA1_1 and DMA4_1, respectively. Each of the second-sub-commands SCMD2_1 and SCMD2_2 is converted into 64 DMA descriptors DMA2_1 through DMA2_64 or DMA2_65 through DMA2_128 and each of the third-sub-commands SCMD3_1 through SCMD3_4 is converted into 64 DMA descriptors DMA3_1 through DMA3_64, DMA3_65 through DMA3_128, DMA3_129 through DMA3_192, or DMA3_193 through DMA3_256. The DMA descriptors DMA1_1, DMA2_1 through DMA2_128, DMA3_1 through DMA3_256, and DMA4_1 are stored in a third queue 319 in order.

Figure 10:
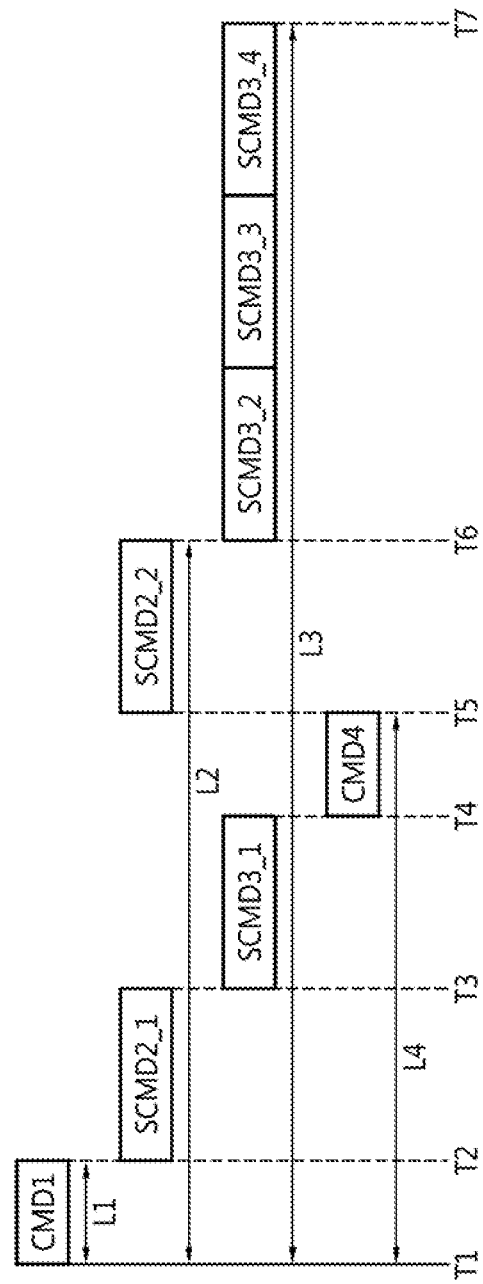
FIG. 10 is a timing chart of command processing of a data storage device according to embodiments illustrated in FIGS. 7 through 9.

FIG. 10 is a timing chart of the command processing of the data storage device 300 according to embodiments illustrated in FIGS. 7 through 9. Referring to FIGS. 1 through 10, the CPU 313, or firmware run in the CPU, determines the order of processing the commands CMD1, SCMD2_1 and SCMD2_2, SCMD3_1 through SCMD3_4, and CMD4 stored in the first queue 317 and the second queue 318. The data storage device 300 first processes the commands CMD1, SCMD2_1, SCMD3_1, and CMD4 stored in the first queue 317 in order and then processes the commands SCMD2_2 and SCMD3_2 through SCMD3_4 stored in the second queue 318 in order.

Referring to FIG. 10, of the first through fourth commands CMD1 through CMD4 issued at the first time point T1, the first command CMD1 finishes processing at time T2 with a latency L1, and the first second-sub-command SCMD2_1 of the second command CMD2 finishes processing at time T3. The DMA manager 430 can store, in the context saving block 432, an index of the first DMA descriptor DMA2_65 of the second second-sub-command SCMD2_2 stored in the third queue 319.

After the first second-sub-command SCMD2_1 has been processed, the first third-sub-command SCMD3_1 and the fourth command CMD4 can be sequentially processed, finishing at times T4 and T5, respectively. After the first third-sub-command SCMD3_1 has been processed, the DMA manager 430 can store, in the context saving block 432, an index of the first DMA descriptor DMA3_65 of the second third-sub-command SCMD3_2 stored in the third queue 319.

There is no command in the first queue 317 after the fourth command CMD4 is processed, and therefore, the second second-sub-command SCMD2_2 stored in the second queue 318-2 can be processed, finishing at time T6 with a latency L2. The DMA manager 430 processes the second second-sub-command SCMD2_2 using the index of the first DMA descriptor DMA2_65 of the second second-sub-command SCMD2_2, which is stored in the context saving block 432. After the second second-sub-command SCMD2_2 is processed, the processing of the second command CMD2 is completed.

After the second second-sub-command SCMD2_2 has been processed, the second through fourth third sub-commands SCMD3_2 through SCMD3_4 can be sequentially processed, finishing at time T7 with a latency L3. The DMA manager 430 processes the second through fourth third-sub-commands SCMD3_2 through SCMD3_4 using the index of the first DMA descriptor DMA3_65 of the second third-sub-command SCMD3_2, which is stored in the context saving block 432. After the fourth third-sub-command SCMD3_4 is processed, the processing of the third command CMD3 is completed.

Consequently, the fourth command CMD4 is processed before the second and third commands CMD2 and CMD3 are processed, and a processing time and a latency L4 of the fourth command CMD4 is reduced as compared to conventional approaches.

As described above with reference to FIGS. 3 through 6, the number of commands processed between sub-commands may vary with different embodiments.

Figure 11:
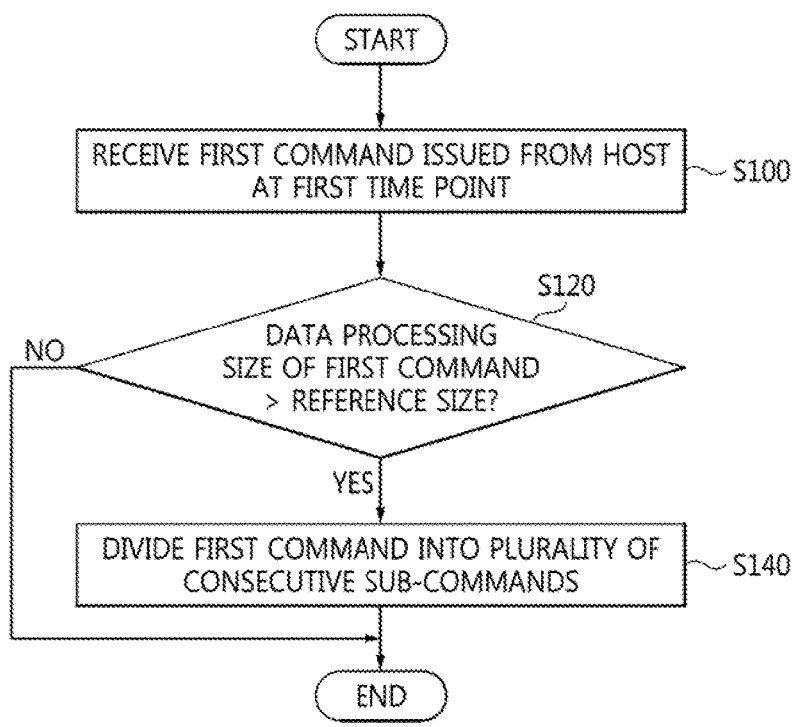
FIG. 11 is a flowchart of a method of operating a data storage device according to some embodiments of the inventive concept.

FIG. 11 is a flowchart of a method of operating the data storage device 300 according to some embodiments of the inventive concept. Referring to FIGS. 1 through 6, and FIG. 11, the data storage device 300 receives a first command, such as the second command CMD2 in FIG. 3, issued from the host 200 at the first time point T1 in operation S100.

According to some embodiments, the data storage device 300 compares a data processing size of the second command CMD2 with a reference size in operation S120. If the data processing size is greater than the reference size, (YES in operation S120), the data storage device 300 divides the second command CMD2 into a plurality of consecutive second-sub-commands SCMD2_1 through SCMD2_4 in operation S140.

If a second command, such as the third command CMD3 in FIG. 3, issued at the first time point T1 is received from the host 200, the data storage device 300 determines the order of processing the second and third commands CMD2 and CMD3 and processes the first second-sub-command SCMD2_1 and the third command CMD3 in the determined order.

After the first second-sub-command SCMD2_1 and the third command CMD3 are processed, the data storage device 300 processes the remaining second-sub-commands SCMD2_2 through SCMD2_4 in order. When a third command, such as the fifth command CMD5 in FIG. 3, is received at the second time point T2 while the third second-sub-command SCMD2_3 is being processed, the data storage device 300 can process the fifth command CMD5 after processing the third second-sub-command SCMD2_3 and before processing the fourth second-sub-command SCMD2_4. After the fourth second-sub-command SCMD2_4 is processed, the second command CMD2 is processed completely after the fifth command CMD5 is processed.

Figure 12:
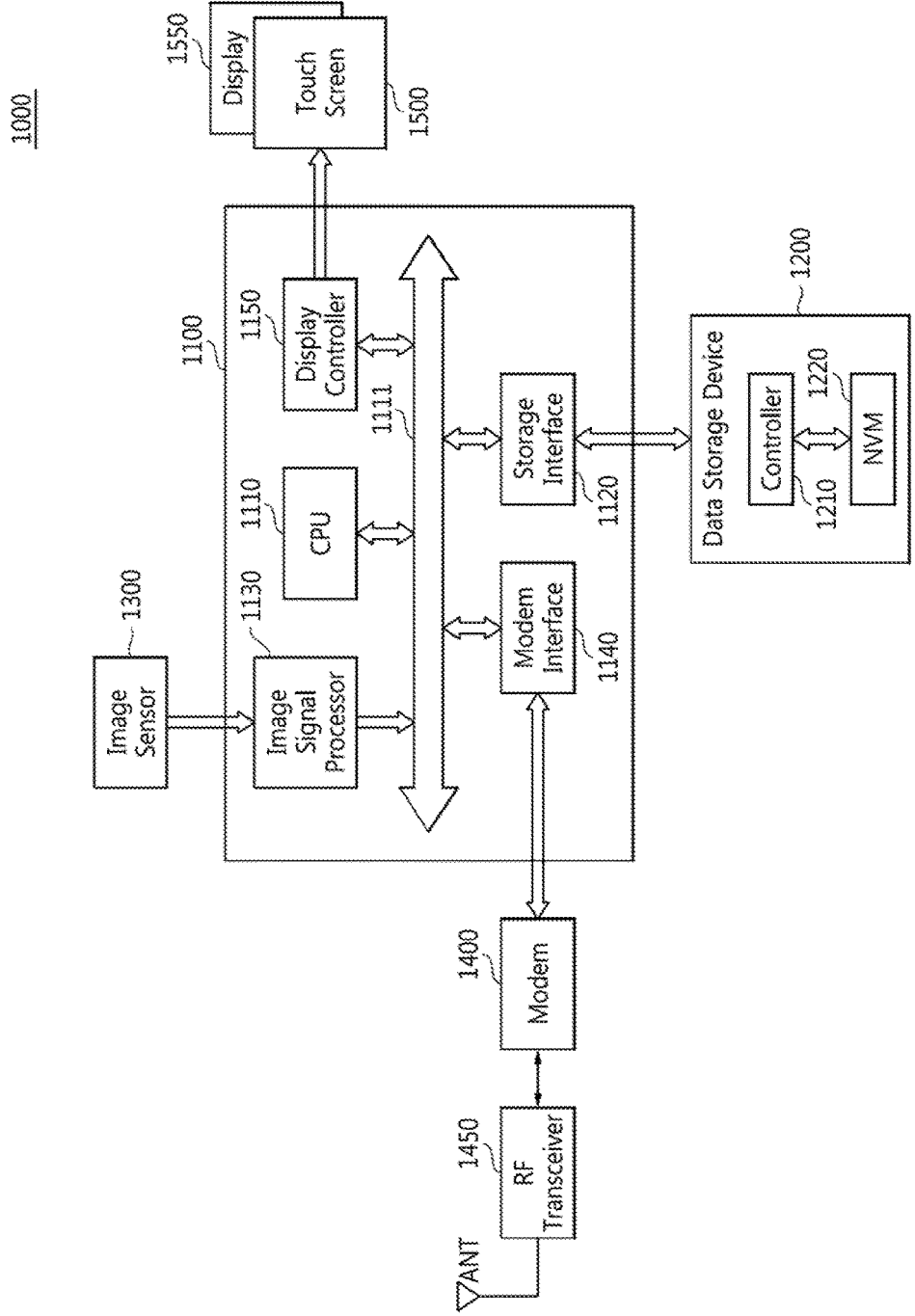
FIG. 12 is a block diagram of a data processing system according to other embodiments of the inventive concept.

FIG. 12 is a block diagram of a data processing system 1000 according to other embodiments of the inventive concept. Referring to FIGS. 1 through 12, the data processing system 1000 may be a mobile computing device. A mobile computing device may be a laptop computer, a cellular phone, a smart phone, a tablet PC, a personal digital assistant (PDA), an enterprise digital assistant (EDA), a digital still camera, a digital video camera, a portable multimedia player (PMP), a personal navigation device or portable navigation device (PND), a handheld game console, a MID, a wearable computer, an internet of things (IoT) device, an internet of everything (IoE) device, or an e-book.

According to some embodiments, the data processing system 1000 includes an application processor (AP) 1100, a data storage device 1200, an image sensor 1300, a modem 1400, a radio frequency (RF) transceiver 1450, and a display 1550 including a touch screen 1500. The data storage device 1200 may be the data storage device 300 illustrated in FIG. 1. A controller 1210 may be the controller 310 illustrated in FIG. 1 and a non-volatile memory (NVM) 1220 may be the NVM 350 illustrated in FIG. 1.

According to some embodiments, the image sensor 1300 converts an optical image into an electrical signal to generate image data. The RF transceiver 1450 transmits radio data received through an antenna ANT to the modem 1400, and converts data received from the modem 1400 into a radio signal and transmits the radio signal through the antenna ANT to an external device.

According to some embodiments, the modem 1400 processes data communicated between the RF transceiver 1450 and the AP 1100. The AP 1100 controls the data storage device 1200, the image sensor 1300, the modem 1400, the RF transceiver 1450, the touch screen 1500, and/or the display 1550.

The AP 1100 may be implemented as an IC, a SoC, or a mobile AP. According to some embodiments, the AP 1100 includes a CPU 1110, bus architecture 1111, a storage interface 1120, an image signal processor 1130, a modem interface 1140, and a display controller 1150.

According to some embodiments, the CPU 1110 controls the storage interface 1120, the image signal processor 1130, the modem interface 1140, and the display controller 1150 through the bus architecture 1111. The bus architecture 1111 may be implemented as an AMBA, an AHB, an advanced peripheral bus (APB), an AXI, or an advanced system bus (ASB), but embodiments of the inventive concept are not limited thereto.

According to some embodiments, the storage interface 1120 controls processing and/or transmission of data communicated with the data storage device 1200 under control of the CPU 1110. The image signal processor 1130 receives and processes image data output from the image sensor 1300 and transmits the processed image to the bus architecture 1111. The modem interface 1140 controls processing and/or transmission of data communicated with the modem 1400 under control of the CPU 1110.

According to some embodiments, the display controller 1150 transmits data to be displayed on the display 1550 to the display 1550 under control of the CPU 1110. The display controller 1150 and the display 1550 may communicate data with each other using a mobile industry processor interface (MIPI®) display serial interface. Alternatively, the display controller 1150 and the display 1550 may communicate data with each other using an embedded DisplayPort (eDP).

According to some embodiments, the touch screen 1500 receives user input for controlling the operation of the data processing system 1000 and transmits the user input to the AP 1100. The user input can be generated by touching the touch screen 1500 of the data processing system 1000. The CPU 1110 controls the operations of the AP 1100, the image sensor 1300, and/or the display 1550 based on the user input received from the touch screen 1500.

Figure 13:
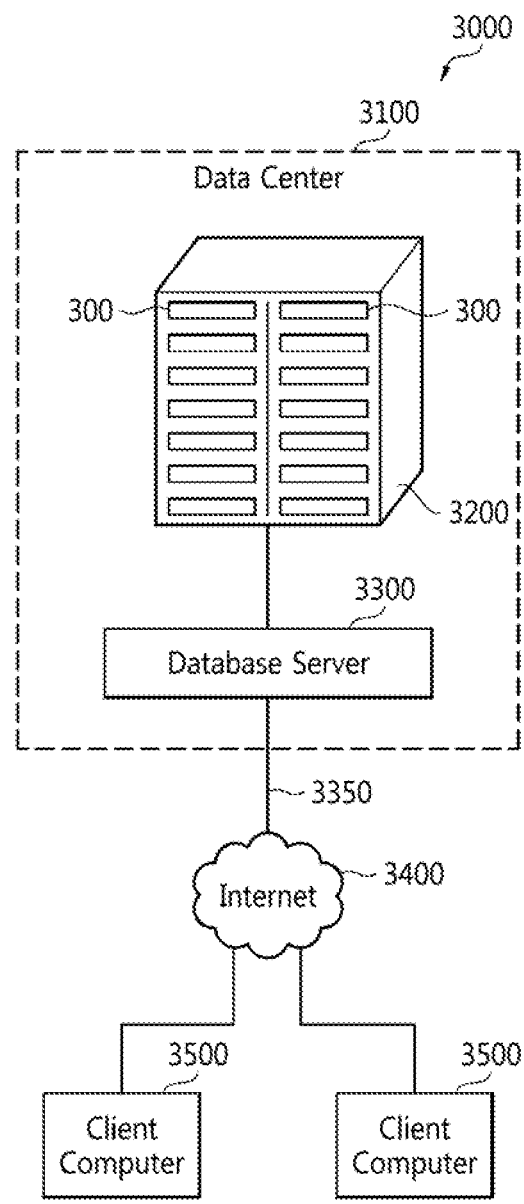
FIG. 13 is a block diagram of a data processing system according to further embodiments of the inventive concept.

FIG. 13 is a block diagram of a data processing system 300 according to further embodiments of the inventive concept. Referring to FIGS. 1 through 13, the data processing system 3000 includes a database 3200, a database server 3300, a second network 3400, and a plurality of client computers 3500. The database 3200 and the database server 3300 may be included in a data center 3100. The data center 3100 may be an internet data center or a cloud data center.

According to some embodiments, the database 3200 includes a plurality of data storage devices 300. The data storage devices 300 may be installed in racks. The structure and operations of the data storage devices 300 are substantially the same as or similar to those of the data storage device 300 described above with reference to FIGS. 1 through 11.

According to some embodiments, the database server 3300 controls the operations of each of the data storage devices 300. The database server 3300 is connected to the second network 3400, such as the Internet, via a first network 3350, such as a local area network (LAN). The client computers 3500 can be connected to the database server 3300 via the second network 3400.

As described above, according to some embodiments of the inventive concept, a data storage device divides a command into a plurality of sub-commands depending on the data processing size of the data and processes other commands between sub-commands, thereby reducing a difference in latency between commands. As a result, the quality of service (QoS) of the data storage device is increased.

While embodiments of the inventive concept have been particularly shown and described with reference to exemplary embodiments thereof, it will be understood by those of ordinary skill in the art that various changes in forms and details may be made therein without departing from the spirit and scope of the embodiments of inventive concept as defined by the following claims.

What is claimed is:

1. A data storage device connected with a host, the data storage device comprising:
    a processor;
    a memory that includes a first queue and a second queue; and
    a non-volatile memory,
    wherein the processor compares a data processing size of a first command received from the host at a first time point with a reference size and divides the first command into a plurality of sub-commands when the data processing size is greater than the reference size, and a first sub-command of the plurality of sub-commands to be processed is stored in the first queue and remaining plurality of sub-commands are stored in the second queue,
    wherein when the processor receives a second command from the host at the first time point, the processor processes one of the first sub-command and the second command based on the order in which the first command and the second command have been received, and
    the processor processes the remaining plurality of sub-commands after processing the first sub-command and the second command.

2. The data storage device of claim 1, wherein when the processor receives a plurality of third commands from the host at the first time point after receiving the first and second commands,
    the processor processes a predetermined number of third commands between processing individual sub-commands of the remaining plurality of sub-commands.

3. The data storage device of claim 1, wherein when a second command is received while one but not the last of the plurality of sub-commands is being processed,
    the processor processes the second command before the last of the plurality of sub commands is processed.

4. The data storage device of claim 1, further comprising a controller that controls data processing operations of the non-volatile memory based on the first command, wherein the controller supports a protocol for processing commands out of order.

5. The data storage device of claim 4, wherein the controller comprises a context saving block that stores information about a subsequent sub-command after one of the plurality of sub-commands is processed.

6. The data storage device of claim 1, wherein a data processing size of each of the plurality of sub-commands is less than or equal to the reference size, and the reference size and the data processing size of each of the plurality of sub-commands are changeable using firmware.

7. The data storage device of claim 1, wherein the data storage device is one of a solid state drive (SSD) or a universal flash storage (UFS).

8. A data processing system comprising:
    a data storage device that includes a processor and a non-volatile memory; and
    a host that controls an operation of the data storage device,
    wherein the data storage device receives a plurality of commands at a first time point and compares a data processing size of each command received from the host at the first time point with a reference size, and, when the data processing size of a first command is greater than the reference size, divides the first command into a plurality of sub-commands having a data processing size less than or equal to than the reference size;

wherein the data storage device processes a first sub-command and a second command received after the first command based on the order in which the first and second commands are received, and processes the remaining sub-commands after processing the first sub-command and the second command; and processes a predetermined number of third commands received after the second command between processing individual sub-commands of a remaining plurality of sub-commands.

9. The data processing system of claim 8, wherein when a fourth command is received while one but not the last one of the plurality of sub-commands is being processed, the processor processes the fourth command before the last of the sub commands is processed.

10. The data processing system of claim 8, wherein the data storage device further comprises a memory that includes a first queue and a second queue, wherein a first sub-command of the plurality of sub-commands to be processed is stored in the first queue, and the remaining plurality of sub-commands are stored in the second queue.

11. The data processing system of claim 8, wherein when the processor receives the second command from the host at the first time point, the processor processes one of the first sub-command and the second command based on the order in which the first command and the second command have been received.

12. The data processing system of claim 11, wherein the processor processes the remaining plurality of sub-commands after processing the first sub-command and the second command.

13. The data processing system of claim 8, wherein the data storage device further comprises a controller that controls data processing operations of the non-volatile memory based on the first command, wherein the controller supports a protocol for processing commands out of order, wherein the controller comprises a context saving block that stores information about a subsequent sub-command after one of the plurality of sub-commands is processed.

14. The data processing system of claim 8, wherein a data processing size of each of the plurality of sub-commands is less than or equal to the reference size, and the reference size and the data processing size of each of the plurality of sub-commands are changeable using firmware.

15. A method of operating a data storage device, comprising the steps of:

receiving a first command from a host at a first time point;

comparing a data processing size of the first command with a reference size;

dividing the first command into a plurality of consecutive sub-commands, if the data processing size is greater than the reference size; and storing a first sub-command of the plurality of sub-commands to be processed in a first queue and remaining plurality of sub-commands in a second queue, wherein upon receiving a second command from the host at the first time point, the method further comprises determining the processing order of the first and second commands;

processing a first sub-command and the second command in the determined order; and processing the remaining plurality of sub-commands in order.

16. The method of claim 15, wherein upon receiving a third command at a second time point while a current sub-command is being processed, the method further comprises processing the third command after processing the current sub-command and before processing a subsequent sub-command.

* * * * *